Patented Dec. 26, 1933

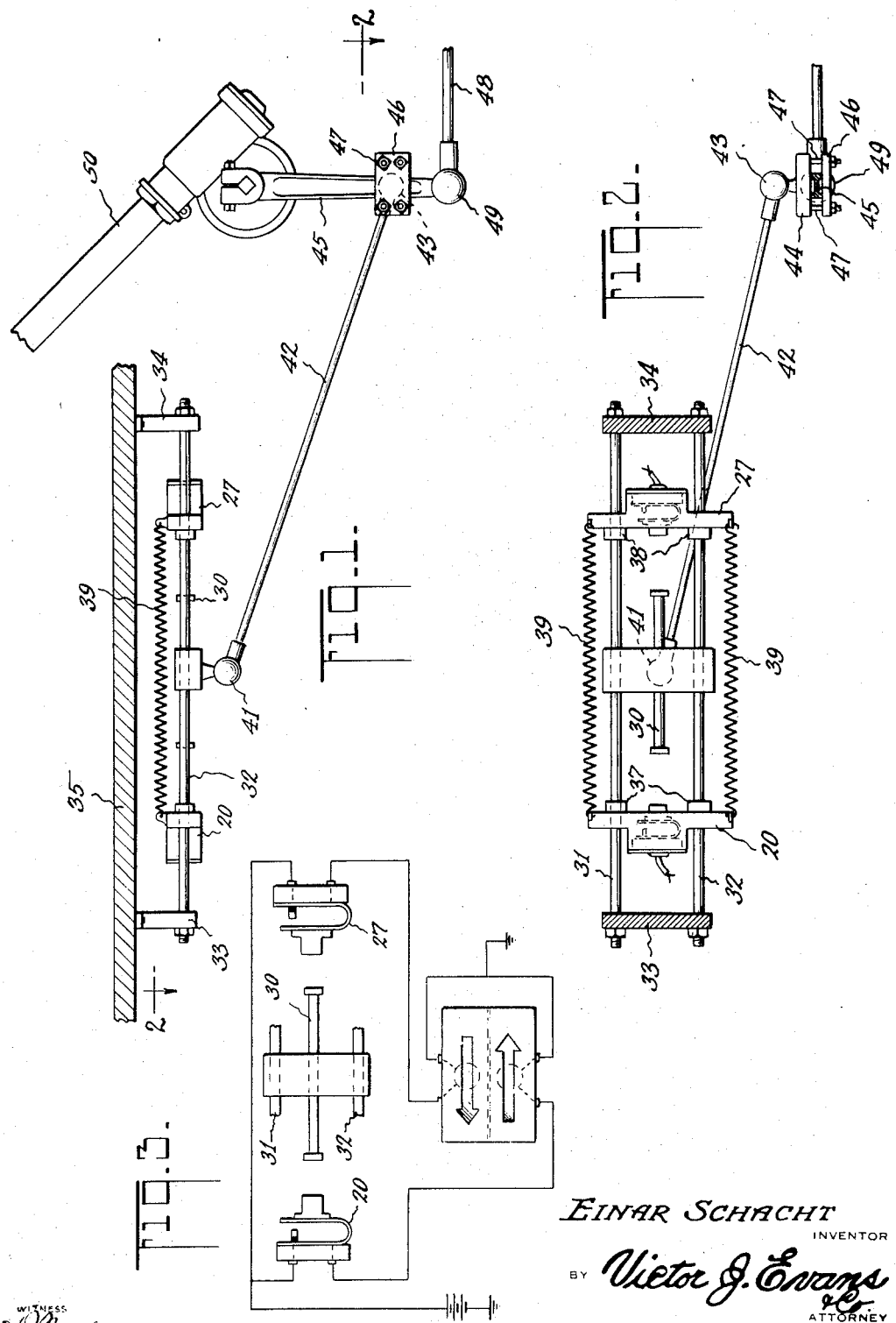

1,941,274

UNITED STATES PATENT OFFICE 1,941,274

ELECTRIC SWITCH

Einar Schacht, St. Albans, N. Y.

Application April 5, 1932. Serial No. 603,368

2 Claims. (Cl. 200—1)

This invention relates to electric switches.

In the drawing:

Fig. 1 is a side elevation of mechanism employed in my invention.

Fig. 2 is a plan view taken approximately on the line 2—2 of Fig. 1; and

Fig. 3 is a diagram of right and left turn-indicating mechanism and electrical apparatus for actuating the same.

Referring to the drawing for a more detailed description thereof, a pair of opposed switches 20 and 27 of the spring type are included in circuits, as shown in Fig. 3, and are normally open, means being provided for closing the mentioned switches, one at a time. Said means comprises a rod 30, one end of which is adapted to close the switch 20 and the other end of which is adapted to close the switch 27. Said rod is slidably mounted on a pair of parallel rails 31 and 32 which are held in brackets 33 and 34, said brackets, as shown in Fig. 1, being secured to the underside of a running board 35. The mentioned switches are also slidably mounted on the rails 31 and 32, the switch 20 being limited in its movements on the rails by the bracket 33 and a pair of stops 37 which are mounted on the rails 31 and 32. Switch 27 is limited in its movements by the bracket 34 and by stops 38, which are mounted on the rails 31 and 32. The mentioned switches are connected together by means of helical springs 39 which function to return the switches to their respective stops 37 and 38 when pushed outwardly beyond the same by the rod 30.

The rod 30 is connected by means of a universal joint 41 to a link 42 connected to a universal joint 43 mounted on a plate 44 which is secured to an automobile steering arm 45 by means of a plate 46 and bolts 47 connecting the two plates. The steering arm 45 is connected to the drag link 48 by means of a universal joint 49. The steering arm 45 is connected to a steering post 50 by means of the usual mechanism. It is evident from the foregoing description that a turning of the steering post to the right is effective to cause the rod 30 to move rearwardly to close the switch 20, and that a turning of the steering post 15 to the left is effective to cause the rod 30 to move forwardly and close the switch 27.

What is claimed as new is:

1. Electrical switch mechanism comprising a pair of parallel rails, spring switches slidably mounted on said rails, spring means adapted to pull said switches toward each other, switch closing means slidably mounted on said rails and adapted to selectively close one switch by movement in one direction and the other switch by movement in the opposite direction.

2. Electrical switch mechanism comprising a pair of parallel rails, spring switches slidably mounted on said rails, spring means adapted to pull said switches toward each other, switch closing means slidably mounted on said rails and adapted to selectively close one switch by movement in one direction and the other switch by movement in the opposite direction, said spring means comprising a pair of helical coils.

EINAR SCHACHT.